United States Patent
Kager

[11] 3,852,565
[45] Dec. 3, 1974

[54] SOLDER FEEDING SOLDERING GUN WITH TEMPERATURE CONTROL

[76] Inventor: Alfred Kager, 71, Inkeidener Strasse, Frankfurt am Main, Germany

[22] Filed: Sept. 12, 1972

[21] Appl. No.: 288,466

[52] U.S. Cl. .................. 219/241, 219/230, 226/128, 228/53
[51] Int. Cl. ......................... H05b 1/02, B23k 3/06
[58] Field of Search.... 219/227, 229, 230, 235–241; 228/51–55; 226/127–133

[56] References Cited
UNITED STATES PATENTS

| | | | |
|---|---|---|---|
| 2,432,428 | 12/1947 | Lang | 219/230 UX |
| 2,454,875 | 11/1948 | Hyde | 226/128 |
| 2,558,009 | 6/1951 | Smoke | 219/230 UX |
| 2,952,763 | 9/1960 | Gustafsson | 219/230 X |
| 3,097,286 | 7/1963 | Luke | 228/53 |
| 3,181,763 | 5/1965 | Koga | 228/53 |
| 3,393,856 | 7/1968 | Fortune | 228/53 |
| 3,560,710 | 2/1971 | Fuellemann | 219/241 UX |
| 3,622,746 | 11/1971 | Trouilhet | 219/227 X |
| 3,707,258 | 12/1972 | Schlitt | 228/52 |

FOREIGN PATENTS OR APPLICATIONS

| | | | |
|---|---|---|---|
| 481,669 | 3/1938 | Great Britain | 219/230 |
| 507,997 | 6/1939 | Great Britain | 228/53 |

*Primary Examiner*—A. Bartis
*Attorney, Agent, or Firm*—Markva & Smith

[57] ABSTRACT

A one-hand soldering gun includes a two-part hollow plastic casing, one part of which has integrally formed therein a pivot pin for supporting a toothed feed wheel, elements defining a slideway for a soldering wire, slotted holders for securing a spring to press the solder wire against the periphery of the feed wheel, and pins for detachably affixing terminals of a conductor plate. Means is provided in the casing for controlling the temperature of the soldering iron. A trigger including a pawl serves to rotate the feed wheel, feeding the soldering wire against the heated soldering iron.

5 Claims, 10 Drawing Figures

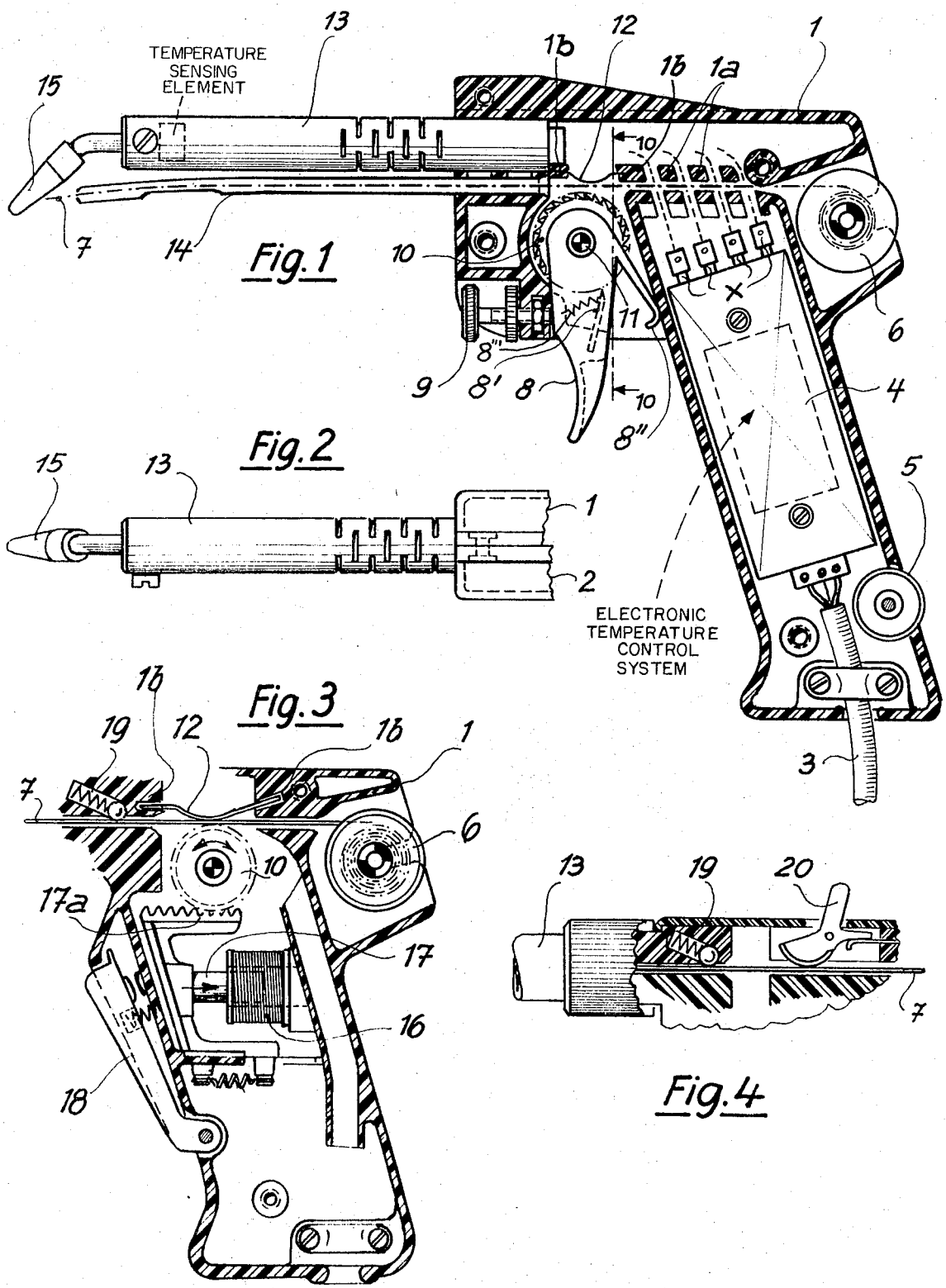

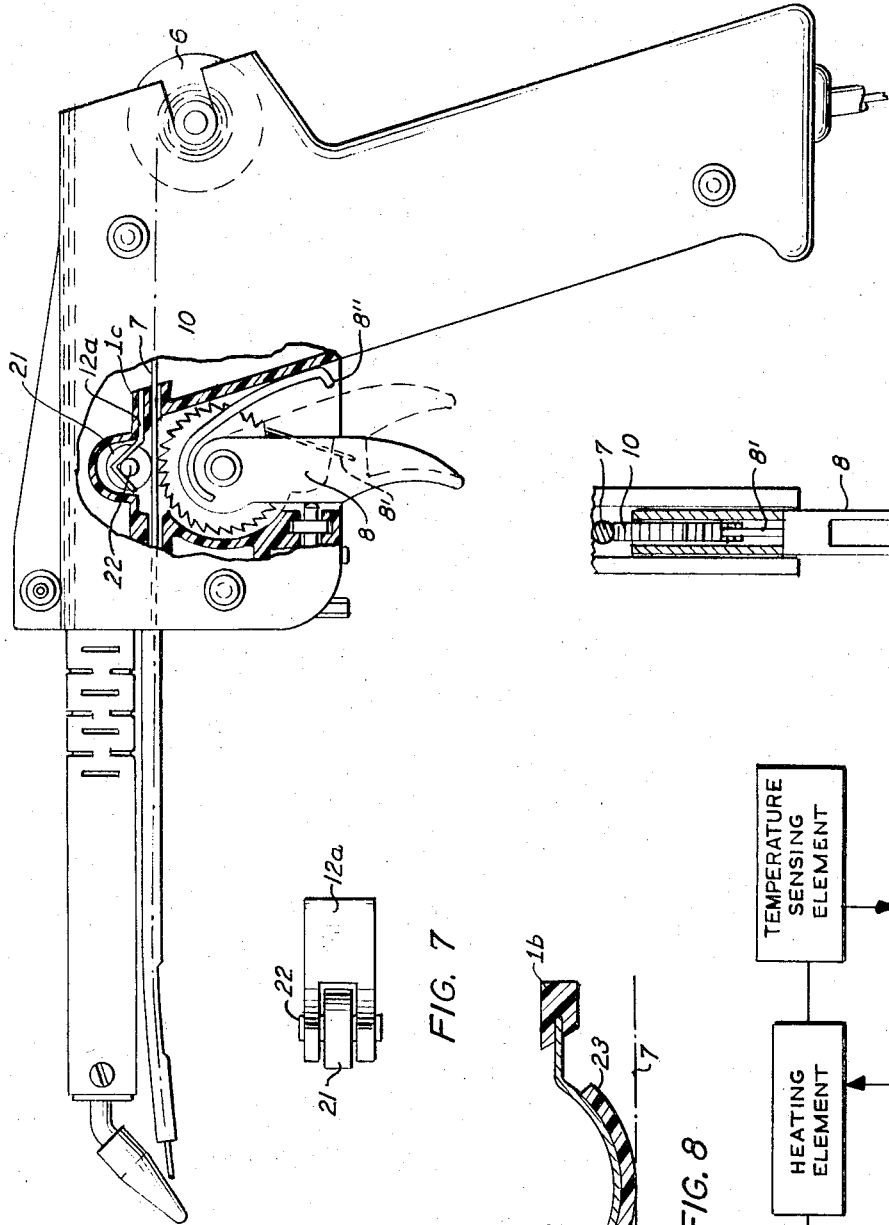

SOLDER FEEDING SOLDERING GUN WITH TEMPERATURE CONTROL

BACKGROUND OF THE INVENTION

This invention relates to a one-hand soldering gun with mechanically or electrically operable feed means for the soldering wire as well as temperature control means for the soldering iron.

One-hand soldering guns of this kind are generally known in the art but they have many disadvantages.

SUMMARY OF THE INVENTION

It is the object of the invention to overcome these disadvantages and to provide a one-hand soldering gun with a novel design of a plastic casing as well as substantial simplifications in the mechanically or electrically operable feed means. The proposed features are also advantageous from the point of view of cost.

To attain this object the present invention provides a one-hand soldering gun having temperature control means, which comprises a two-part plastic casing; a barrel and a feed tube projecting forwardly from said casing; a heating element in the barrel; a replaceable soldering iron on the forward end of the barrel; means for feeding a soldering wire from a supply bobbin toward said soldering iron, said feeding means including a toothed feed wheel rotatable on a pivot pin and arranged directly to contact and advance the soldering wire; elements defining a slideway for the soldering wire; slotted holders for the detachable reception of a press-down spring pressing said soldering wire against the periphery of said feed wheel, and pins for the detachable affixation of terminals on a divided conductor plate contained inside the casing, said pivot pin, said elements defining the slideway, said slotted holders and said pins for the detachable affixation of the terminals on the divided conductor plate being formed integral with one of the parts of the two-part plastic casing.

The proposed one-hand soldering gun has the advantage that, as compared with the known one-hand soldering guns, by virtue of its compact dimensions the distance between the user's hand holding the soldering gun and the joint or seam to be soldered can be minimized, a feature which facilitates the soldering work and enables a much safer and more precise application of the soldering gun to the work. Low weight is naturally a special advantage which assists in simplifying the working process.

In the proposed arrangement it is preferred to provide an electronic control system for keeping the point of the soldering iron at a constant desired temperature when this has been selected. The measurement of the actual temperature may be kept constant with the aid of a bridge circuit containing variable resistors. Such a bridge circuit consisting of an association of several resistors, a capacitor, a silicon rectifier and other components permit a temperature to be kept at a desired level by the error signal obtained from the diagonal of the bridge.

BRIEF DESCRIPTION OF THE DRAWING

Several embodiments of the invention will now be described by way of example and with reference to the accompanying drawing, in which:

FIG. 1 is a view of an embodiment of a soldering gun according to the invention, showing its interior;

FIG. 2 is a fragmentary view of the soldering gun from above;

FIG. 3 is a view of electrical feed means in another embodiment of the soldering gun, FIG. 4 is a modification of a detail of soldering wire FIGS. 5, 6 and 7 show a further embodiment of the soldering gun;

FIG. 8 is a detailed view of the hold-down spring of FIG. 1;

FIG. 9 is a schematic circuit diagram of the conductor plate shown in FIG. 1; and FIG. 10 is a sectional view taken along the line 10—10 of FIG. 1.

DESCRIPTION OF THE PREFERRED EMBODIMENTS

FIGS. 1 and 2 show a one-hand soldering gun according to the invention which has a casing consisting of two parts 1 and 2 of plastic construction. Part 1 of the casing is integral with a slideway 1a for the feeding of a soldering wire 7, and with slotted holders 1b for the reception of the end or ends of a press-down spring 12. Parts 1a and 1b are both integral portions of part 1 of the casing. 3 is a cable for the supply of power to a divided conductor plate 4 contained inside the butt portion of part 1 of the casing and serving as a base for a set of electronic components. x are terminals detachably affixed to pins which are also integral with part 1 of the casing. 5 is the rotary setting knob for a potentiometer, 6 is a spool for the reception and supply of soldering wire 7. A pivot pin 11 which is also integral with part 1 of the casing carries a trigger 8 with a longitudinal slot therein containing a pawl 8' and formed with a resilient extension 8''. The pivot pin 11 also carries a ratchet wheel 10 located in a longitudinal slot in the trigger for advancing the soldering wire 7. Spring 8''' biases the pawl 8' against the ratchet wheel 10. Adjustment of a screw 9 with a milled head permits the deflection angle of the trigger 8 and hence the distance the soldering wire 7 is advanced to be optionally varied. The slotted holders 1b for the reception of the ends of the suitably arched steel pressdown spring 12 comprises two parts. 13 is a tubular barrel enclosing a heating element. At the end of the heating element is the temperature sensitive element of the electronic temperature control means. 14 is the feed tube for the soldering wire 7 and 15 is a replaceable soldering iron.

In the embodiment illustrated in FIG. 3 electrical feed means for the soldering wire 7 comprise a solenoid 16, 17 having its plunger connected to a spring-loaded T-shaped member carrying a rack 17a, activation of the solenoid being by the deflection of a spring-loaded operating trigger 18. 19 is a one-way locking wall device which permits the soldering wire 7 to advance towards the soldering point but frictionally locks it in the opposite direction.

The modified arrangement in FIG. 4 likewise comprises a one-way locking ball device 19 and a manually operable retaining and releasing lever 20 for the soldering wire 7.

The press down spring 12 which presses the soldering wire 7 against the feed wheel may be provided on its side contacting the soldering wire with a non-metallic coating or with a separate liner made of plastic, glass, porcelain or the like as shown at 23 in FIG. 8 to prevent the spring material from being tinned. Alternatively, the spring may be made completely of plastic material.

Referring to FIGS. 5, 6 and 7 showing a further embodiment of the invention, a different kind of press-down spring 12a is mounted on a slotted holder 1c. The deflectable end of the spring 12a carries a pressdown roller 21 of metal or plastic which rotates about axis 22 as the wire advances.

As already mentioned the temperature of the soldering iron 15 is to be controlled by electronic control means, the divided conductor plate 4 serving as a base for mounting the electronic components.

Referring to FIG. 9, an electronic temperature control system is provided which controls the temperature of the replaceable soldering iron by comparing the voltages in a resistance bridge circuit, the electronic circuit elements being affixed to the divided conductor plate inside the butt portion of the one-hand soldering gun. A temperature sensitive device is located inside the heating element directly adjacent the end of the soldering iron.

If the soldering wire 7 is taken directly through the heating element it is preferably protected by a temperatureresistant plastic sheath to prevent thermal damage.

The invention may be embodied in other specific forms without departing from the spirit or essential characteristics thereof. The embodiments are therefore to be considered in all respects as illustrative and not restrictive.

What is claimed is:

1. A one-hand soldering gun having temperature control means comprising
   a. a two-part hollow plastic casing including a butt portion;
   b. a barrel and a feed tube projecting forwardly from said casing;
   c. a heating element in the barrel;
   d. a replaceable soldering iron on the forward end of the barrel;
   e. means for feeding a soldering wire from a supply bobbin toward said soldering iron, said feeding means including a ratchet feed wheel rotatable on a pivot pin and arranged directly to contact and advance the soldering wire, a trigger having a longitudinally extending slot therein mounted on said pin, said ratchet wheel being located in said slot in said trigger, and a spring biased pawl mounted in said slot in said trigger for engaging said ratchet wheel;
   f. elements defining a slideway for the soldering wire;
   g. a pair of spaced slotted holders, a press-down spring detachably secured and extending between said slotted holders and pressing said soldering wire against the periphery of said feed wheel, and
   h. pins for the detachable affixation of terminals on a divided conductor plate supporting an electronic temperature control system contained inside the casing, said pivot pin, said elements defining the slideway, said slotted holders and said pins for the detachable affixation of the terminals on the divided conductor plate being formed integral with said one of the parts of the two-part plastic casing.

2. A one-hand soldering gun as defined in claim 1, wherein said press-down spring is sprung into position between said slotted holders and presses said soldering wire against the periphery of said toothed feed wheel, said press-down spring being made of strip steel and provided on its side contacting said soldering wire with a non-metallic coating made of a material selected from the group consisting of plastics, glass and porcelain.

3. A one-hand soldering gun as defined in claim 1, wherein said press-down spring is made of plastic.

4. A one-hand soldering gun as defined in claim 1, comprising a screw with a milled head for adjusting the deflection angle of said trigger.

5. A one-hand soldering gun as defined in claim 1, wherein said temperature control system for the replaceable soldering iron is based on an electronic control system which controls the temperature of said replaceable soldering iron by a voltage comparison in a resistance bridge circuit, the electronic circuit elements being affixed to said divided conductor plate inside the butt of the one-hand soldering gun, whereas a temperaturesensitive device is located inside the heating element directly adjacent the end of the soldering iron.

* * * * *